United States Patent
Cheng et al.

(10) Patent No.: US 9,954,251 B2
(45) Date of Patent: Apr. 24, 2018

(54) ELECTROLYTE FORMULATIONS FOR ELECTROCHEMICAL CELLS CONTAINING A SILICON ELECTRODE

(71) Applicant: Wildcat Discovery Technologies, Inc., San Diego, CA (US)

(72) Inventors: Gang Cheng, San Diego, CA (US); Deidre Strand, San Diego, CA (US); Ye Zhu, San Diego, CA (US); Marissa Caldwell, San Diego, CA (US)

(73) Assignee: WILDCAT DISCOVERY TECHNOLOGIES, INC, San Diego, CA (US)

( * ) Notice: Subject to any disclaimer, the term of this patent is extended or adjusted under 35 U.S.C. 154(b) by 0 days.

(21) Appl. No.: 15/045,902

(22) Filed: Feb. 17, 2016

(65) Prior Publication Data

US 2016/0240889 A1    Aug. 18, 2016

Related U.S. Application Data

(60) Provisional application No. 62/117,077, filed on Feb. 17, 2015, provisional application No. 62/117,084, filed on Feb. 17, 2015.

(51) Int. Cl.
| | |
|---|---|
| *H01M 4/134* | (2010.01) |
| *H01M 10/0567* | (2010.01) |
| *H01M 10/0525* | (2010.01) |
| *H01M 10/0569* | (2010.01) |

(52) U.S. Cl.
CPC ....... *H01M 10/0567* (2013.01); *H01M 4/134* (2013.01); *H01M 10/0525* (2013.01); *H01M 10/0569* (2013.01)

(58) Field of Classification Search
CPC ................. H01M 10/0567; H01M 4/134
See application file for complete search history.

(56) References Cited

U.S. PATENT DOCUMENTS

| | | | | |
|---|---|---|---|---|
| 5,268,118 | A * | 12/1993 | Bloodworth | C10M 171/001 252/572 |
| 5,549,987 | A * | 8/1996 | Venugopal | H01M 2/1653 252/62.2 |
| 8,765,295 | B2 * | 7/2014 | West | H01M 10/052 429/188 |
| 2001/0023039 | A1 * | 9/2001 | Liu | H01M 2/1653 429/217 |
| 2002/0106560 | A1 * | 8/2002 | Kolb | H01M 4/366 429/212 |
| 2009/0169976 | A1 * | 7/2009 | Takahashi | H01M 10/0565 429/493 |
| 2010/0035160 | A1 * | 2/2010 | Yoon | H01M 10/052 429/330 |
| 2011/0183216 | A1 * | 7/2011 | Kim | H01M 10/052 429/338 |
| 2013/0136998 | A1 * | 5/2013 | Hwang | H01M 10/0565 429/303 |

(Continued)

*Primary Examiner* — Jonathan G Jelsma
(74) *Attorney, Agent, or Firm* — Corridor Law Group, P.C.

(57) ABSTRACT

Additives to electrolytes that enable the formation of comparatively more robust SEI films on silicon anodes. The SEI films in these embodiments are seen to be more robust in part because the batteries containing these materials have higher coulombic efficiency and longer cycle life than comparable batteries without such additives.

8 Claims, 3 Drawing Sheets

(56) References Cited

U.S. PATENT DOCUMENTS

| | | | |
|---|---|---|---|
| 2014/0255792 A1* | 9/2014 | Cao | H01M 10/0565 |
| | | | 429/303 |
| 2014/0302399 A1* | 10/2014 | Saimen | H01M 10/0525 |
| | | | 429/308 |
| 2015/0037667 A1* | 2/2015 | Suguro | H01M 4/386 |
| | | | 429/200 |
| 2015/0109651 A1* | 4/2015 | Branda | G02F 1/17 |
| | | | 359/238 |

* cited by examiner

ELECTROLYTE FORMULATIONS FOR ELECTROCHEMICAL CELLS CONTAINING A SILICON ELECTRODE

CROSS-REFERENCE TO RELATED APPLICATIONS

This application claims priority to U.S. Provisional Application No. 62/117,077 filed Feb. 17, 2015 entitled "Electrolyte Formulations" and U.S. Provisional Application No. 62/117,084 filed Feb. 17, 2015 entitled "Electrolyte Formulations." This application claims priority to and the benefit of each of these applications, and each application is incorporated herein by reference in its entirety.

BACKGROUND OF THE INVENTION

The present invention is in the field of battery technology and, more particularly, electrolyte formulations that address challenges encountered during the use of silicon anodes in lithium ion batteries.

Lithium ion batteries enjoy relatively widespread use, but research continues into improving the energy density, capacity, and cycle life of these batteries. For example, silicon has been used as an anode material to improve the energy density of lithium ion cells. Silicon anodes can provide high energy density to lithium ion batteries due to the high theoretical capacity of silicon, which is 4200 mAh/g. However, the silicon particles that make up the anode can undergo larges changes in their volume during battery cycling. The volumetric changes on lithiation and delithiation cycles can be as large as about 300%.

These large volumetric changes in the silicon anode material can have negative effects on battery cycle life. A number of mechanisms may contribute to poor cycle life. For example, silicon particles can fracture due to the large stresses in the material brought on by the large changes in volume during cycling. These fractures can result in electrically isolated particle fragments that can no longer contribute to the capacity during cycling. Even when silicon particles do not completely fracture, the large stresses in the anode material can result in cracks in the particle and delamination of the particle surface. These cracks and delaminations can result in portions of the active material being electrically isolated and unable to contribute to the capacity during cycling.

As another example of a failure mechanism, the solid-electrolyte interphase (SEI) that forms on the surface of silicon anode particles tends to not be mechanically robust. The result is cracking and delamination of this thin SEI layer on the particles as the large volume changes occur. Therefore, more SEI must be formed on each cycle to replace the cracked or delaminated SEI. But, this is not ideal because forming SEI irreversibly consumes battery capacity and creates gas products. Generally, a stable SEI should be formed on the initial cycles and should not need to be reformed.

Thus, there exists a need for an electrolyte formulation for silicon anodes in a lithium ion battery that improves cycle life by forming a more mechanically robust SEI. These and other challenges can be addressed by certain embodiments of the invention described herein.

BRIEF SUMMARY OF THE INVENTION

Embodiments of the present invention are additives to electrolytes that enable the formation of comparatively more robust SEI films on silicon anodes. The SEI films in these embodiments are seen to be more robust in part because the batteries containing these materials have higher coulombic efficiency and longer cycle life than comparable batteries without such additives.

Embodiments of the present invention include the methods of making such electrolytes using the additives disclosed herein, the methods of assembling batteries including such electrolytes using the additives disclosed herein, and using batteries including such electrolytes using the additives disclosed herein.

Embodiments of the present invention include an electrochemical cell having a silicon based anode and a liquid electrolyte solution comprising a soluble additive. The additive is represented by the chemical structural formula:

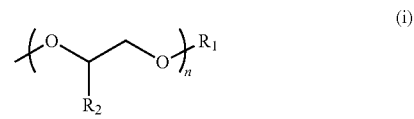

where $n \geq 1$, $R_2$ is a substituted or unsubstituted alkyl group or a hydrogen and $R_1$ is a substituted or unsubstituted acrylate. In some embodiments, $R_1$ is represented by the chemical structural formula:

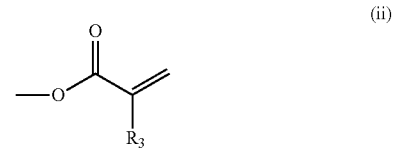

where $R_3$ is a substituted or unsubstituted alkyl group or a hydrogen. In some embodiments, the additive includes poly(ethylene glycol) methyl ether acrylate. In some embodiments, the additive includes ethylene glycol methyl ether acrylate. In some embodiments, the additive includes di(ethylene glycol) ethyl ether acrylate.

Embodiments of the present invention include an electrochemical cell having a silicon based anode and a liquid electrolyte solution comprising a soluble additive. The additive is represented by the chemical structural formula:

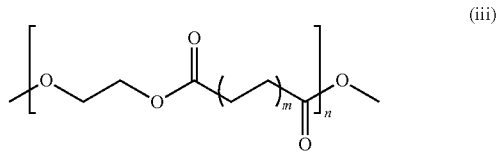

where $m \leq 3$ and $n > 1$. In some embodiments, the additive includes poly(ethylene) adipate. In some embodiments, the additive includes poly[di(ethylene glycol) adipate].

Embodiments of the present invention include an electrochemical cell having a silicon based anode and a liquid electrolyte solution comprising a soluble additive. The additive is represented by the chemical structural formula:

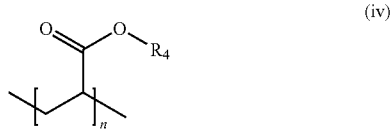

(iv)

where n≥1 and $R_4$ is a substituted or unsubstituted alkyl chain. In some embodiments, the additive includes a fluorine-substituted alkyl chain. In some embodiments, the additive includes poly(2,2,2-trifluoroethyl acrylate).

In certain embodiments, the electrolyte solution includes a blend of a high dielectric solvent and a low viscosity solvent. In some embodiments, the blend includes propylene carbonate or ethyl methyl carbonate.

DETAILED DESCRIPTION OF THE INVENTION

Figure 1:
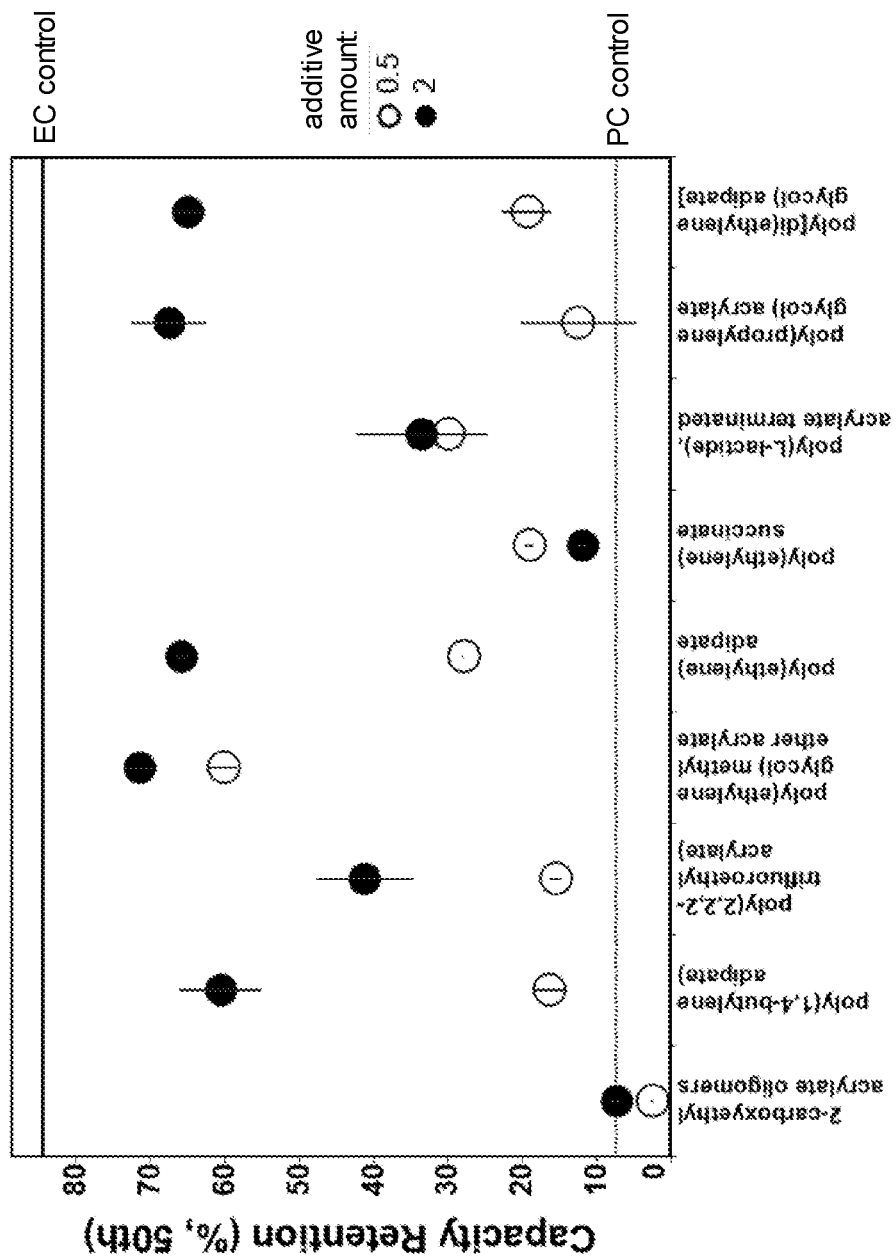
FIG. 1 illustrates the results of electrochemical testing of several additives in electrolyte solutions according to embodiments disclosed herein.

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The term "about" refers to the range of values approximately near the given value in order to account for typical tolerance levels, measurement precision, or other variability of the embodiments described herein.

A rate "C" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

Ranges presented herein are inclusive of their endpoints. Thus, for example, the range 1 to 3 includes the values 1 and 3 as well as the intermediate values.

In some embodiments disclosed herein, electrolyte solutions formulated to contain specific additive types can improve energy density, capacity, and cycle life of these batteries.

Silicon-containing anodes can provide a higher energy density than carbon-based anodes. While the theoretical capacity of a silicon anode is on the order of 4200 mAh/g, it is necessary to balance the high capacity of a silicon anode with the undesirable properties that a silicon anode can have. For example, a silicon anode can have relatively high changes in volume during a charge/discharge cycle. The volumetric changes in a silicon anode can be from 70% to 300% over the range of desired anode capacities. That is, for an anode where only a small portion of the silicon capacity is utilized, the silicon may experience a volumetric change on the order of about 70%. In contrast, for an anode where a comparatively high portion of the silicon capacity is utilized, the silicon may experience a volumetric change on the order of about 300%. In certain embodiments disclosed herein, silicon anodes with capacities in the range of about 600 mAh/g to about 1200 mAh/g are matched with cathode materials having a similar capacity to yield a battery that demonstrates stable cycle life in the presence of an electrolyte containing additives discloses herein. The electrolyte additives disclosed herein provide an unexpected improvement in the capacity fade during cycling compared to the baseline formulations without such additives in batteries containing a silicon-based anode.

Known batteries containing silicon anodes experience limited cycle life and poor coulombic efficiency. The deficiencies of known batteries containing silicon-based anode can be due to a loss of connectivity in the anode of the active silicon material. The loss of connectivity can be due to structural defects in the anode related to the large change in volume experienced by the anode. The large volumetric changes can result in cracking and/or delamination of the electrode. Also, the large volumetric changes may be related to an unstable or ineffective SEI on the active silicon electrode. Further, the SEI formed from an ethylene carbonate based electrolyte on a silicon anode may also be unstable or ineffective regardless of the volumetric changes experiences by a silicon based anode.

In some circumstances, electrolyte formulations that do not contain ethylene carbonate are desired. Certain additives disclosed herein provide surprising improvements to the performance of non-ethylene carbonate based electrolyte formulations.

In other circumstances, certain additives are required to improve the mechanical stability of the SEI formed in the presence of ethylene carbonate. The additives disclosed herein provide surprising improvements to the performance of batteries containing silicon based anodes.

The additives disclosed herein yield an electrolyte solution that provides an electrochemically and mechanically robust SEI. The additives disclosed herein yield an electrolyte solution that enables the SEI to withstand the relatively large volumetric expansions and contractions known to occur in silicon-based anodes. These additives enable both the anode and cathode to be chemically, electrochemically, and mechanically stable through multiple battery cycles.

Certain additives disclosed in electrolyte formulations described herein are capable of enabling the formation of stable SEI with organic solvents other than ethylene carbonate. Based on prior uses with silicon anodes, it appears that electrolytes based on ethylene carbonate will remain inadequate for forming a stable SEI. Thus, the additives disclosed herein, in combination with electrolyte solvents other than ethylene carbonate, can yield a stable SEI on a silicon-based anode. These additives have significant solubility in the selected electrolyte solvents.

Alternatively, certain additives disclosed in electrolyte formulations described herein are capable of enabling the formation of stable SEI with organic solvents such as ethylene carbonate. Based on prior uses of silicon anodes, it appears that electrolytes based on ethylene carbonate would be inadequate for forming a stable SEI. Surprisingly, the additives disclosed herein can yield a stable SEI on a silicon-based anode when used in electrolyte formulations based on ethylene carbonate.

Notably, most electrolyte formulations for silicon anodes, and for the more common carbon anodes, contain ethylene carbonate (EC). EC is understood to play an important role in the formation of a stable SEI on carbon anodes. EC also participates in SEI formation on silicon, but, as discussed above, the SEI formed on silicon anodes using conventional electrolytes (including EC) is not mechanically robust. The lack of mechanical robustness is evidenced by poor electrochemical performance, such as poor coulombic efficiency and poor cycle life. Physically, films that lack mechanical robustness may appear to be inhomogeneous and/or may appear to have physical defects. Mechanically robust SEI forms a stable film at the electrode/electrolyte interface.

Certain of the embodiments disclosed herein depart from the known and conventional electrolyte formulations by removing EC from the electrolyte formulation. Because EC is understood to play an important role in the formation of a stable SEI on carbon anodes, it is seemingly counterintuitive to remove the EC from the electrolyte formulation and still form a robust SEI. Yet, the embodiments disclosed herein demonstrate a robust SEI formed using electrolyte formulations that do not contain EC.

Useful non-EC solvents will have a comparatively high dielectric constant. Such useful solvents include solvents including lactones, nitriles, sulfones, and carbonates. In particular, carbonate solvents, including but not limited to such as propylene carbonate and diphenyl carbonate, are useful in formulations disclosed herein. In some cases, a low viscosity solvent, and in particular a carbonate solvent such as ethyl methyl carbonate, is included in the formulation.

In some embodiments, certain additives disclosed herein result in improved coulombic efficiency and cycle life when used in electrolyte formulations containing propylene carbonate (PC) and ethyl methyl carbonate (EMC). In some embodiments, certain additives provide performance improvements when used in formulations containing other organic solvents including, but not limited to, dimethyl carbonate and diethyl carbonate. Unexpectedly, the additives disclosed herein did not demonstrate comparable beneficial effects on the SEI layer when used in formulations containing EC. Thus, the additives disclosed herein are preferably used in electrolyte formulations that do not contain EC.

The additives disclosed herein were chosen, in part, based on the hypothesized effects that they may have on the SEI layer on the anode. The desired effects include improving the mechanical properties of the SEI, modifying the ratio of organic components to inorganic components in the SEI, modifying the thickness of the SEI, and/or improving the uniformity of the SEI.

Using electrolyte additives disclosed herein, improvement was demonstrated in full cells containing $LiNi_{0.4}Mn_{0.4}Co_{0.2}O_2$ (NMC) cathodes and silicon alloy anodes. Certain electrolyte formulations preferably do not contain EC. Certain preferred formulations contain PC, EMC, or blends thereof and one or more of the additives. Other electrolyte formulations preferably contain EC. Certain additives can improve coulombic efficiency and cycle life by forming a more mechanically robust SEI layer on the silicon anode. This may be due to a more polymeric nature of the resulting SEI or a modified ratio of organic components as compared to inorganic components in the SEI.

In other embodiments, certain additives disclosed herein result in improved coulombic efficiency and cycle life when used in formulations containing EC. These additives disclosed herein appear to not have a comparable benefit when used in non-EC containing formulations, suggesting a surprising synergy when combined with ethylene carbonate to form the SEI layer on a silicon anode.

Without being bound to any particular hypothesis or mechanism of action, some of the additives disclosed herein may react with the EC to increase the molecular weight of the SEI that forms on the anode. Certain additives may act in a way analogous to chain extenders in the context of polymer formulation and processing, thereby increasing the molecular weight and film forming capability of the SEI that is typically generated from the EC in a conventional electrolyte solution.

The amount of additive can be expressed as a weight percent (wt %) of the total weight of the electrolyte formulation. In certain embodiments of the invention, the additive is present at an amount that is significantly lower than the amount of electrolyte salt present in the electrolyte formulation of the electrochemical cell. In certain embodiments of the invention, the concentration of additive in the electronic formulation is less than or equal to about 5 weight percent, more preferably less than or equal to about 4 weight percent, more preferably less than or equal to about 3 weight percent, and still more preferably less than or equal to about 2 weight percent.

In certain embodiments of the invention, the concentration of additive in the electronic formulation is equal to about 6.0 wt %, 5.9 wt %, 5.8 wt %, 5.7 wt %, 5.6 wt %, 5.5 wt %, 5.4 wt %, 5.3 wt %, 5.2 wt %, 5.1 wt %, 5.0 wt %, 4.9 wt %, 4.8 wt %, 4.7 wt %, 4.6 wt %, 4.5 wt %, 4.4 wt %, 4.3 wt %, 4.2 wt %, 4.1 wt %, 4.0 wt %, 3.9 wt %, 3.8 wt %, 3.7 wt %, 3.6 wt %, 3.5 wt %, 3.4 wt %, 3.3 wt %, 3.2 wt %, 3.1 wt %, 3.0 wt %, 2.9 wt %, 2.8 wt %, 2.7 wt %, 2.6 wt %, 2.5 wt %, 2.4 wt %, 2.3 wt %, 2.2 wt %, 2.1 wt %, 2.0 wt %, 1.9 wt %, 1.8 wt %, 1.7 wt %, 1.6 wt %, 1.5 wt %, 1.4 wt %, 1.3 wt %, 1.2 wt %, 1.1 wt %, 1.0 wt %, 0.9 wt %, 0.8 wt %, 0.7 wt %, 0.6 wt %, 0.5 wt %, 0.4 wt %, 0.3 wt %, 0.2 wt %, or 0.1 wt %.

Methods

Battery Cell Assembly.

Battery cells were assembled in a high purity argon filled glove box (M-Braun, $O_2$ and humidity content<0.1 ppm). A $LiNi_{0.4}Mn_{0.4}Co_{0.2}O_2$ (NMC) cathode electrode and a silicon alloy/graphite anode electrode were used. Each battery cell includes a cathode film, a polypropylene separator, and composite anode film. Electrolyte components were formulated and added to the battery cell.

Non-EC Electrolyte Formulations.

Electrolyte formulations used as controls were made from one or more organic solvents and a lithium salt. Organic solvents propylene carbonate (PC) and ethyl methyl carbonate (EMC) were blended at a 1:4 ratio, by volume, of PC:EMC. The lithium salt was LiPF$_6$ at a concentration of 1M. In some cases, the control electrolyte formulation was made from ethylene carbonate (EC). The electrolyte formulations containing additives were made from PC:EMC (1:4 by volume) with 1M LiPF$_6$ at a variety of additive weight percentages.

EC Electrolyte Formulations.

Electrolyte formulations used as controls were made from one or more organic solvents and a lithium salt. Organic solvents ethylene carbonate (EC) and ethyl methyl carbonate (EMC) were blended at a 1:2 ratio, by volume, of EC:EMC. The lithium salt was LiPF$_6$ at a concentration of 1M. In some cases, the control electrolyte formulation was made from PC:EMC (1:4 by volume) with 1M LiPF$_6$. The electrolyte formulations containing additives were made from 1:2 ratio, by volume, of EC:EMC with 1M LiPF$_6$ at a variety of additive weight percentages.

SEI Formation.

Solid-electrolyte interphase (SEI) is formed during a formation cycle. For the cells tested herein, the formation cycle was 12 hours open current voltage (OCV) hold, followed by a C/10 charge to 4.2 V with a constant voltage (CV) hold to C/20, and then a C/10 discharge to 2.8 V.

Cycle Life Testing.

For cycle life testing, cycling was continued at C/5 charge to 4.2 V with a CV hold to C/20 followed by a C/5 discharge to 2.8 V.

Results

FIG. 1 illustrates the results of electrochemical testing of several additives in electrolyte solutions according to embodiments disclosed herein. Specifically, the average capacity retention at the fiftieth charge cycle is represented in FIG. 1 as a percentage of the capacity at the first test cycle. The additives were tested in electrolyte formulations including 0.5 weight percent and 2 weight percent of the additive. Generally speaking, the performance of the additives was better at the higher concentration. FIG. 1 illustrates the performance of two different non-additive electrolyte solutions of the purpose of comparison to the additive formulations. The dotted line labeled "PC Control" represents the average performance of a control electrolyte formulated from PC/EMC organic solvents. This control formulation does not contain additives. The solid line at the top of FIG. 1 illustrates another type of control, which is an electrolyte formulated from EC/EMC organic solvents with no additives. For reference, the control electrolyte formulated from a conventional EC organic solvent shows about an 83% average capacity retention in this type of test.

The additives tested and illustrated in FIG. 1 include 2-carboxyethyl acrylate oligomers (M$_n$=170); poly(1,4-butylene adipate) (M$_n$=12,000); poly(2,2,2-trifluoroethylacrylate), poly(ethylene glycol) methyl ether acrylate (M$_n$=2,000); poly(ethylene adipate) (M$_n$=10,000); poly(ethylene) succinate (M$_n$=10,000); poly(L-lactide) acrylate terminated (M$_n$=5,500); poly(propylene glycol) acrylate (M$_n$=475); and poly[di(ethylene glycol) adipate] (M$_n$=2,500). M$_n$ is the number average molar mass of the additives. FIG. 1 illustrates that additives including ethylene oxide/glycol functionality perform well in the PC/EMC electrolyte solutions. The additives improve the performance of the PC/EMC based electrolyte solutions. Generally, the additives improved performance of the control electrolyte formulations in a concentration dependent manner.

A generic chemical structural representation for certain embodiments of additives suitable for improving the performance of PC/EMC based electrolyte solutions is:

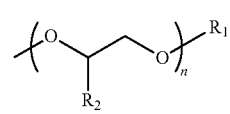

(i)

where n≤1, R$_2$ is an alkyl or a hydrogen and R$_1$ is a substituted or unsubstituted acrylate, where substitutions are preferably substituted or unsubstituted alkyl groups. The other terminus of the polymer/oligomer chain is preferably hydrogen or a substituted or unsubstituted alkyl group. Examples of particularly preferable R$_1$ groups can be represented as:

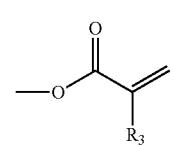

(ii)

where R$_3$ is a substituted or unsubstituted alkyl group or hydrogen.

Certain other additives suitable for improving the performance of PC/EMC based electrolyte solutions can be represented as:

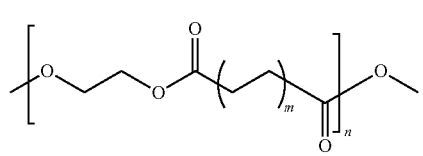

(iii)

where m≤3 and n>1.

Certain other additives suitable for improving the performance of PC/EMC based electrolyte solutions can be represented as:

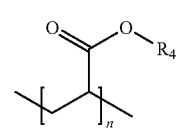

(iv)

where n≥1 and R$_4$ is preferably a substituted or unsubstituted alkyl chain, with fluorine being a particularly preferable substitution in the alkyl chain. Of course, known substitutions that do not significantly alter the target properties and functionality of structures (i)-(iv) are within the scope of this disclosure.

Table 1 presents the electrochemical performance of electrolyte formulations containing various additives according to certain combinations of the above structural representations as compared to a control electrolyte formulation. Each of the additives was tested at formulations including 2 weight percent of the additive and PC/EMC organic solvents. Table 1 groups the additives in various categories, although the category label is not exclusive, nor should it be taken as limiting the identity of the specific additive. The capacity retention at the fiftieth discharge cycle is presented in the far right column as a percentage of the capacity at the first test cycle.

TABLE 1

Performance of polymers and acrylate monomers as electrolyte additives in PC based electrolyte

| Additive Category | Additive ID# | Additive name | Structure | Capacity Retention (%, 50th) |
|---|---|---|---|---|
| Polymers | | control | — | 7.4 ± 5.0 |
| | 1 | poly(ethylene glycol) methyl ether acrylate | | 71.4 |
| | 2 | poly(propylene glycol) acrylate | | 67.4 |
| | 3 | poly(ethylene) adipate | | 65.8 |
| | 4 | poly[di(ethylene glycol)adipate] | | 64.8 |
| | 5 | poly(1,4-butylene adipate) | | 60.6 |
| | 6 | poly(2,2,2-trifluoroethyl acrylate) | | 41.2 |
| | 7 | poly(L-lactide), acrylate terminated | | 33.5 |
| | 8 | poly(ethylene) succinate | | 11.8 |
| | 9 | 2-carboxyethyl acrylate oligomers | | 7.3 |
| Acrylate Monomer | 10 | ethylene glycol methyl ether acrylate | | 55.3 |

TABLE 1-continued

Performance of polymers and acrylate monomers as electrolyte additives in PC based electrolyte

| Additive Category | Additive ID# | Additive name | Structure | Capacity Retention (%, 50th) |
|---|---|---|---|---|
| | 11 | di(ethylene glycol) ethyl ether acrylate | 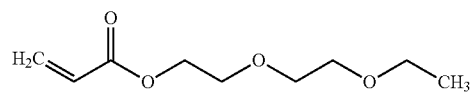 | 63.9 |
| | 12 | 2-ethylhexyl acrylate | 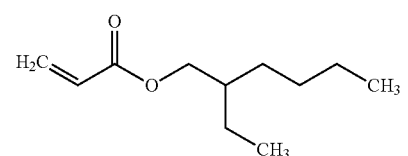 | 21.3 |
| | 13 | butyl acrylate | 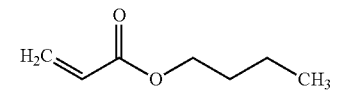 | 16.2 |

Some of the additives (such as poly(L-lactide), acrylate terminated and poly(ethylene) succinate) exhibited very low solubility in the control electrolyte solvents, which could account for their comparatively poor performance.

Table 1 demonstrates the superior properties of the polymeric additives presented in FIG. 1 as compared to certain monomeric acrylate additives. Taken together, FIG. 1 and Table 1 demonstrate superior capacity retention performance at the fiftieth cycle for certain polymer additives in electrolyte formulations containing PC/EMC organic solvent blends.

In further testing, the polymer additives of FIG. 1 were formulated with EC-based electrolyte formulations and with PC-based electrolyte formulations. The results of this testing are presented in Table 2. All additives were used at a concentration of 2 weight percent.

TABLE 2

Comparison of polymer electrolyte additives in EC and PC based electrolyte formulations

| Additive ID# | Capacity Retention (%, 50th) In EC based electrolyte | Capacity Retention (%, 50th) In PC based electrolyte |
|---|---|---|
| control | 83.1 ± 5.8 | 7.4 ± 5.0 |
| 1 | 86.1 | 71.4 |
| 2 | 81.3 | 67.4 |
| 3 | 84.8 | 65.8 |
| 4 | 81.0 | 64.8 |
| 5 | 81.8 | 60.6 |
| 6 | 78.0 | 41.2 |
| 7 | 80.4 | 33.5 |
| 8 | 83.7 | 11.8 |
| 9 | 75.0 | 7.3 |

Table 2 shows that electrolyte formulations containing certain additives, and in particular polymer additives, in NMC/silicon cells resulted in up to a 200% improvement in capacity retention at cycle 50 compared to the PC-based control electrolyte solution. In this case, the PC-based control formulation included PC and EMC. The capacity retention observed due to additives in the PC-based formulation is similar to that observed when EC is added to the electrolyte.

However, it is notable that the polymer additives do not yield comparable improvements in capacity retention at cycle 50 in the EC-based formulations. That is, as compared to the control EC-based formulation, the EC-formulations that contain the preferred polymer additives perform about the same rather than improving the capacity retention.

Figure 2:
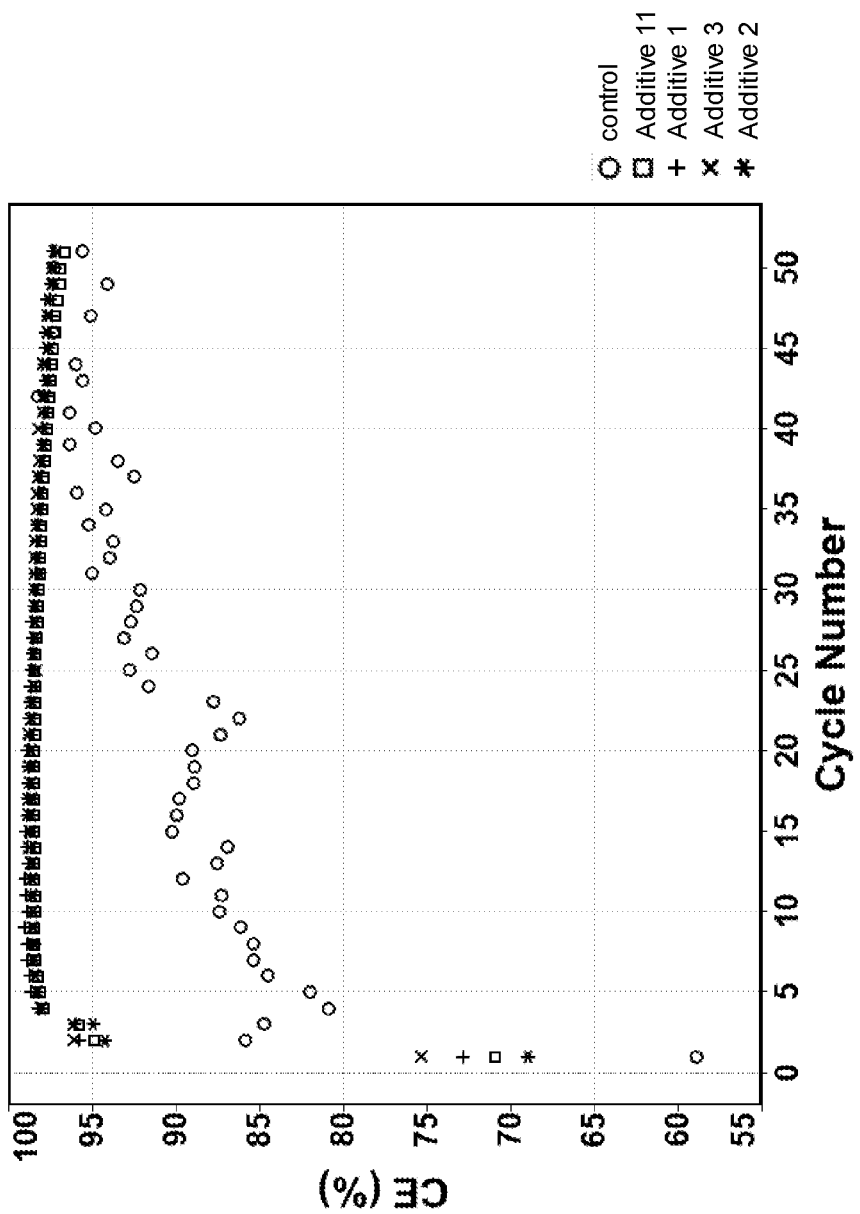
FIG. 2 illustrates the results of electrochemical testing of four different additives in a PC-based electrolyte formulation, in this case a formulation including 1.0M LiPF6 in PC/EMC (1:4, by volume).

FIG. 2 illustrates the results of electrochemical testing of four different additives in a PC-based electrolyte formulation, in this case a formulation including 1.0M LiPF6 in PC/EMC (1:4, by volume). The additives are identified by the numbering scheme of Table 1. FIG. 2 illustrates the coulombic efficiency of the battery containing the various electrolyte formulations versus the cycle number. In this context, coulombic efficiency refers to the percentage of the electrical charge stored during charging that is recoverable during discharge.

Notably, the coulombic efficiency for the formulations containing additives remains high (after the initial formation cycles) through 50 cycles. In contrast, the control formulation shows unacceptably low coulombic efficiency, which gradually increases to match the coulombic efficiency of the formulations including additives. It is important to note, however, that the apparent increase in coulombic efficiency in the control is related to the poor capacity retention in the batteries using the control electrolyte. Recalling FIG. 1, the PC-based control has a capacity retention at the fiftieth cycle of about 7.4% of the first cycle. Thus, the capacity at the fiftieth cycle is low in the control battery due to poor coulombic efficiency.

The formulations disclosed herein, having certain polymeric additives formulated in non-EC based electrolyte formulations, achieve the capacity retention benefits of EC resulting in improved cycle life. That is, FIG. 1 demonstrates capacity retention comparable to the EC-based control in electrolyte formulations that do not contain EC. Further, the coulombic efficiency tests demonstrate the cycle life improvements as compared to control formulations.

In certain embodiments, useful additives share common chemical features, such as the presence of ethylene oxide functionality in a polymer chain, that facilitate good lithium ion conduction in a mechanically robust SEI. Generally, no negative effect on overall cell capacity was observed with the use of the additive formulations of the embodiments disclosed herein as compared to the control electrolytes.

Certain additives disclosed herein can be used to formulate electrolytes that result in improved coulombic efficiency and improved cycle life as compared to electrolyte formulations without the additives. For example, additives including silyl acrylate groups can improve coulombic efficiency and cycle life in batteries using silicon-based anodes when the additives are present in an electrolyte formulated from ethylene carbonate (EC) and ethyl methyl carbonate (EMC).

Table 3 presents certain additives that provide a benefit to capacity retention in EC/EMC electrolyte formulations, and contrasts these additives with additives that do not provide the same type of benefit.

TABLE 3

Electrochemical Testing of Certain Additives

| Additive | Wt % | Cycle 1 Discharge Capacity (mAh/g) | Average Capacity Retention (%, 100th) |
|---|---|---|---|
| None | 0 | 125.9 | 53.4 |
| di-tert-butyl oxalate | 0.5 | 124.2 | 67.5 |
| butyl acrylate | 2.0 | 126.5 | 53.7 |
| methyl methacrylate | 0.5 | 128.7 | 54.4 |
| t-butyl methacrylate | 0.5 | 123.5 | 63.7 |
| 2-ethylhexyl methacrylate | 0.5 | 123.9 | 64.0 |
| trimethylsilyl acrylate | 0.5 | 121.7 | 63.8 |
| (trimethylsilyl)methacrylate | 2.0 | 126.7 | 71.9 |
| (trimethylsilyl)methacrylate | 0.5 | 125.7 | 59.6 |
| 3-(trimethoxysilyl)propyl methacrylate | 0.5 | 124.7 | 63.8 |
| 3-[tris(trimethylsiloxy)silyl]propylene methacrylate | 0.5 | 128.7 | 67.3 |
| 3-[tris(trimethylsiloxy)silyl]propylene methacrylate | 2.0 | 125.6 | 60.6 |
| Ethyl 2-(trimethylsilylmethyl) acrylate | 0.5 | 125.6 | 61.0 |
| 2,2,2-trifluoroethyl acrylate | 0.5 | 111.7 | 75.2 |
| 2,2,2-trifluoroethyl acrylate | 2.0 | 120.9 | 62.3 |
| poly(ethylene glycol) methyl ether acrylate | 2.0 | 124.3 | 63.2 |
| poly(propylene glycol) acrylate | 0.5 | 120.7 | 54.4 |
| poly(ethylene) adipate | 2.0 | 126.9 | 55.0 |
| poly[di(ethylene glycol) adipate] | 2.0 | 129.2 | 55.0 |
| poly(1,4-butylene adipate) | 2.0 | 127.6 | 53.5 |
| poly(2,2,2-trifluoroethyl acrylate) | 2.0 | 126.9 | 51.1 |
| poly(L-lactide), acrylate terminated | 2.0 | 126.5 | 56.4 |
| poly(ethylene) succinate | 0.5 | 128.8 | 54.7 |

Table 3 shows the discharge capacity at the first test cycle for a variety of additives and a control electrolyte formulation. The control formulation is 1:2 EC:EMC with 1M $LiPF_6$. The battery is formed from a $LiNi_{0.4}Mn_{0.4}Co_{0.2}O_2$ (NMC) cathode material and a silicon alloy/graphite anode. The average capacity retention is calculated from the discharge capacity at the one hundredth cycle divided by the discharge capacity at the first cycle and then expressed as a percentage. The listed capacity retention value is an average of multiple data points.

The control electrolyte formulation had an average capacity retention of 53.4%. Electrolyte formulations with silyl acrylate additives performed better than the control. In some instances, the performance improvement appears to be concentration dependent. For example, the additive (trimethylsilyl)methacrylate appears to provide an increasing benefit with increasing concentration. As another example, 3-[tris(trimethylsiloxy)silyl]propylene methacrylate appears to provide a decreasing benefit with increasing concentration. Other additives showed mixed results in the EC/EMC electrolyte formulation. For example, butyl acrylate and methyl methacrylate both perform about the same as control regarding average capacity retention. In contrast, t-butyl methacrylate, 2-ethylhexyl methacrylate, and 2,2,2-trifluoroethyl acrylate performed at levels comparable to certain silyl acrylate additives. Notably, polymeric additives that include acrylate groups performed about the same as control, while non-polymeric acrylate additives, and in particular non-polymeric silyl acrylate additives, generally performed significantly better than control. Finally, certain non-acrylate additives improved the performance of an EC/EMC electrolyte formulation, such as di-tert-butyl oxalate.

Figure 3:
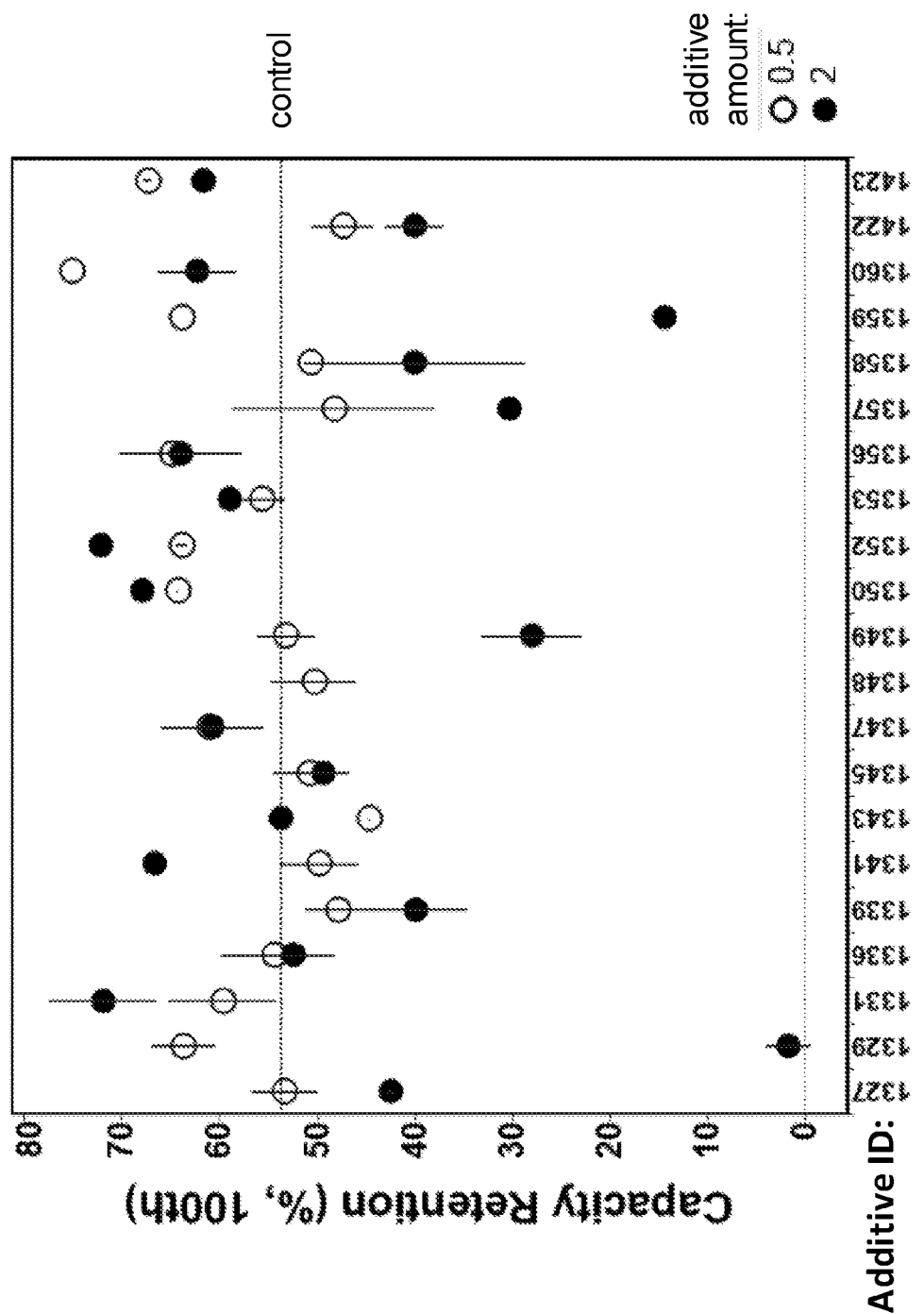
FIG. 3 illustrates the results of electrochemical testing of several additives in electrolyte solutions according to embodiments disclosed herein.

Table 4 identifies the additives by number as presented in the labels along the x-axis of FIG. 3.

TABLE 4

Identification of Certain Additives Presented in FIG. 3

| Additive ID# | Additive Name |
|---|---|
| 1327 | butyl methacrylate |
| 1329 | t-butyl methacrylate |
| 1331 | (trimethylsilyl)methacrylate |
| 1336 | methyl methacrylate |
| 1339 | di(ethylene glycol) ethyl ether acrylate |
| 1341 | 2-ethylhexyl acrylate |
| 1343 | butyl acrylate |
| 1345 | ethyl acrylate |
| 1347 | ethyl 2-(trimethylsilylmethyl) acrylate |
| 1348 | 1,1,1,3,3,3-hexafluoroisopropyl acrylate |
| 1349 | t-butyl acrylate |
| 1350 | 2-ethylhexyl methacrylate |
| 1352 | trimethylsilyl acrylate |
| 1353 | 2,2,2-trifluoroethyl methacrylate |
| 1356 | vinyl acrylate |
| 1357 | proparyl acrylate |
| 1358 | methyl acrylate |
| 1359 | 3-(trimethoxysilyl)propyl methacrylate |
| 1360 | 2,2,2-trifluoroethyl acrylate |
| 1422 | ethylene glycol methyl ether acrylate |
| 1423 | 3-[tris(trimethylsiloxy)silyl]propyl methacrylate |

Certain of the additive compounds that perform better than control share a common acrylate group. In some cases, it is preferred that the additive includes a methacrylate group. Certain of the acrylate or methacrylate groups contain substitution on the hydroxyl end, such as in the case of t-butyl methacrylate depicted below:

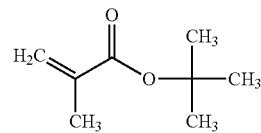

(v)

Another example is 2-ethylhexyl methacrylate, depicted below:

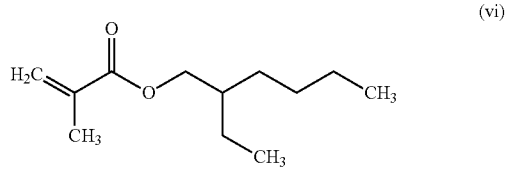

(vi)

Acrylate additives useful in improving the performance of EC-containing electrolyte solutions in a battery with a silicon-based anode include those identified in Table 3, FIG. 3, and Table 4, as well as conventional modifications of such additives.

Other examples of acrylates (and methacrylates) with substitutions at the hydroxyl end include compounds with a silicon-containing substitutions. For example, trimethylsilyl acrylate, depicted below, has a silicon-containing substitution:

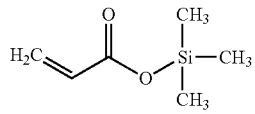

(vii)

And (trimethylsilyl)methacrylate similarly has a silicon-containing substitution at the hydroxyl end:

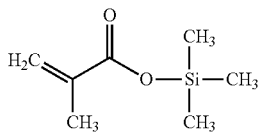

(viii)

Similarly, 3-(trimethoxysilyl)propyl methacrylate has a silicon-containing substitution at the hydroxyl end:

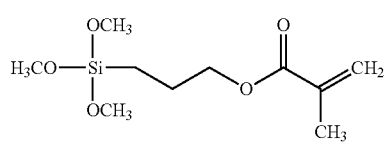

(ix)

And 3-[tris(trimethylsiloxy)silyl]propylene methacrylate a silicon-containing substitution at the hydroxyl end:

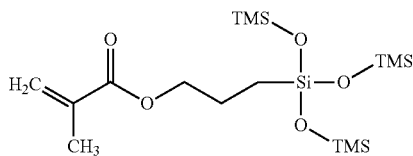

(x)

As with the other acrylate additives, conventional modifications of such silicon-containing additives can be useful in improving the performance of EC-containing electrolyte solutions in a battery with a silicon-based anode.

FIG. 3 illustrates the results of electrochemical testing of several additives in electrolyte solutions according to embodiments disclosed herein. Specifically, the average capacity retention at the hundredth discharge cycle is represented in FIG. 3 as a percentage of the discharge capacity at the first test cycle. Many of the additives were tested in electrolyte formulations at concentrations including 0.5 weight percent and 2 weight percent of the additive. The dotted line labeled "control" represents the average performance of a control electrolyte formulated from EC/EMC organic solvents. This control formulation does not contain additives. For reference, a control electrolyte formulated from a conventional EC organic solvent shows about a 53% average capacity retention in this type of test.

Several of the acrylate-containing additives exhibited performance superior to the control formulation, such as t-butyl methacrylate, (trimethylsilyl)methacrylate, 2-ethyl- hexyl acrylate, ethyl 2-(trimethylsilylmethyl) acrylate, 2-ethylhexyl methacrylate, trimethylsilyl acrylate, vinyl acrylate, 3-(trimethoxysilyl)propyl methacrylate, 2,2,2-trifluoroethyl acrylate, and 3-[tris(trimethylsiloxy)silyl]propyl methacrylate.

Generally, the improvement provided by the additives was demonstrated in the EC-based electrolyte formulations. However, in formulations that do not contain EC, no improvement is observed. These formulations were prepared with propylene carbonate (PC) which, unlike EC, does not participate in SEI formation. Table 5 presents a comparison between EC-based and PC-based formulations.

TABLE 5

Comparison of acrylate performance as electrolyte additives in EC-based and PC-based electrolyte formulations

| Additive ID# | Additive concentration (%) | Capacity Retention (%, 100th Cycle) In EC based electrolyte | Capacity Retention (%, 100th Cycle) In PC based electrolyte |
|---|---|---|---|
| control | 0.0 | 53.3 ± 3.3 | 17.9 ± 15.3 |
| 1329 | 0.5 | 63.7 | 6.0 |
| 1331 | 0.5 | 59.6 | 0.11 |
| 1331 | 2.0 | 71.9 | 0 |
| 1341 | 2.0 | 66.6 | 18.5 |
| 1347 | 0.5 | 61.0 | 6.2 |
| 1347 | 2.0 | 60.7 | 7.2 |
| 1350 | 0.5 | 64.2 | 18.8 |
| 1350 | 2.0 | 67.9 | 34.4 |
| 1352 | 0.5 | 63.8 | 20.6 |
| 1352 | 2.0 | 72.2 | 0.15 |
| 1353 | 2.0 | 58.9 | 35.1 |
| 1356 | 0.5 | 64.8 | 28.1 |
| 1356 | 2.0 | 64.0 | 24.3 |
| 1359 | 0.5 | 63.8 | 36.4 |
| 1360 | 0.5 | 75.2 | 13.2 |
| 1360 | 2.0 | 62.3 | 13.3 |
| 1423 | 0.5 | 67.3 | 11.7 |
| 1423 | 2.0 | 61.7 | 3.0 |

Table 5 presents the capacity retention at the hundredth cycle as expressed as a percent of the first cycle capacity for additives in both EC-based and PC-based electrolyte formulations. The PC-based control formulation was free of additives. The capacity retention of the PC-based control was about 18%, but had high variability such that the capacity retention was as high as about 33%. Only three acrylate additives showed improvement in both the PC-based and EC-based formulations: 2.0 weight percent 2-ethylhexyl methacrylate, 2.0 weight percent 2,2,2-trifluoroethyl methacrylate, and 0.5 weight percent 3-(trimethoxysilyl) propyl methacrylate.

Table 3, Table 5, and FIG. 3 demonstrate the superior properties of acrylate additives in EC-based (particularly EC/EMC) electrolyte formulations. Electrolyte formulations containing the listed additives in NMC//silicon cells resulted in up to a 20% improvement in capacity retention as compared to EC/EMC control without the additives.

Without being bound to any particular hypothesis or mechanism of action, the polymeric additives disclosed herein may accomplish the formation of tougher, more mechanically robust SEI on silicon anodes due to their higher molecular weight nature. The ethylene oxide moieties combined with the comparatively higher molecular weight molecules promote the formation of the mechanically stable SEI with good lithium conductivity. EC has ethylene oxide functionality, but EC may result in comparatively lower molecular weight films and thus may not form mechanically robust SEI films. Support for this hypothesis comes from testing of the performance of the additives in EC-based formulations. The presence of additional ethylene oxide moieties did not appreciably enhance the stability of the film. In the electrolyte formulations disclosed herein, a robust SEI is formed on the silicon anode without the contribution of ethylene oxide groups from the solvents in the electrolyte formulations.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

The invention claimed is:

1. An electrochemical cell comprising:
   a silicon based anode; and
   a lithium ion conducting liquid electrolyte solution comprising a soluble additive wherein the additive is represented by the chemical structural formula:

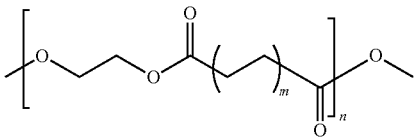

(iii)

where $m \leq 3$ and $n > 1$ and the structure is linear.

2. The electrochemical cell of claim 1 wherein the additive comprises poly(ethylene) adipate.

3. The electrochemical cell of claim 1 the additive comprises poly[di(ethylene glycol) adipate].

4. The electrochemical cell of claim 1 wherein the electrolyte solution further comprises a blend of a high dielectric solvent and a low viscosity solvent.

5. The electrochemical cell of claim 4, wherein the blend comprises propylene carbonate.

6. The electrochemical cell of claim 4, wherein the blend comprises ethyl methyl carbonate.

7. An electrochemical cell comprising:
   a silicon based anode; and
   a lithium ion conducting liquid electrolyte having one or more soluble additives included in a blend of solvents, wherein the additive comprises poly(ethylene adipate), and the blend comprises a high dielectric solvent and a low viscosity solvent.

8. An electrochemical cell comprising:
   a silicon based anode; and
   a lithium ion conducting liquid electrolyte having one or more soluble additives included in a blend of solvents, wherein the additive comprises poly[di(ethylene glycol) adipate], and the blend comprises a high dielectric solvent and a low viscosity solvent.

* * * * *

UNITED STATES PATENT AND TRADEMARK OFFICE
CERTIFICATE OF CORRECTION

PATENT NO. : 9,954,251 B2  
APPLICATION NO. : 15/045902  
DATED : April 24, 2018  
INVENTOR(S) : Gang Cheng et al.

Page 1 of 1

It is certified that error appears in the above-identified patent and that said Letters Patent is hereby corrected as shown below:

In the Specification

At Column 1, Line 16, please insert the following section:
--GOVERNMENT LICENSE RIGHTS
This invention was made with government support under contract number DE-EE0006453 awarded by the Department of Energy. The government has certain rights in the invention.--

Signed and Sealed this
Tenth Day of December, 2019

Andrei Iancu
*Director of the United States Patent and Trademark Office*

UNITED STATES PATENT AND TRADEMARK OFFICE
CERTIFICATE OF CORRECTION

| | |
|---|---|
| PATENT NO. | : 9,954,251 B2 |
| APPLICATION NO. | : 15/045902 |
| DATED | : April 24, 2018 |
| INVENTOR(S) | : Gang Cheng et al. |

It is certified that error appears in the above-identified patent and that said Letters Patent is hereby corrected as shown below:

In the Specification

At Column 1 Line 20, which is below the last paragraph of the section titled "CROSS-REFERENCE TO RELATED APPLICATIONS" and above the section titled "BACKGROUND OF THE INVENTION," include the following statement:

GOVERNMENT LICENSE RIGHTS
This invention was made with government support under contract number DE-EE0006453 awarded by the Department of Energy. The government has certain rights in the invention.

This certificate supersedes the Certificate of Correction issued December 10, 2019.

Signed and Sealed this
Thirtieth Day of April, 2024

Katherine Kelly Vidal
*Director of the United States Patent and Trademark Office*